United States Patent

Helava et al.

[15] 3,678,582

[45] July 25, 1972

[54] PHOTOGRAMMETRIC APPARATUS

[72] Inventors: Uuno V. Helava, Southfield; Robert B. Forrest, Union Lake, both of Mich.

[73] Assignee: The Bendix Corporation

[22] Filed: March 17, 1971

[21] Appl. No.: 125,238

[52] U.S. Cl. ........................................33/20 D

[51] Int. Cl. ........................................B43l 13/16

[58] Field of Search ........................................33/20 D, 1 M, 1 A

[56] References Cited

UNITED STATES PATENTS

| | | | |
|---|---|---|---|
| 3,182,398 | 5/1965 | Santoni | 33/20 D |
| 3,466,646 | 9/1969 | Lewin | 33/1 M X |
| 3,088,209 | 5/1963 | Schwidefsky et al. | 33/20 D |

*Primary Examiner*—Harry N. Haroian
*Attorney*—Fisher & Schmidt, William F. Thornton and Plante, Hartz, Smith & Thompson

[57] ABSTRACT

Photogrammetric apparatus wherein a pair of stereophotographs have their images projected into the apparatus's optical system so as to form a stereomodel therein, which is visually observable through the optical system's binocular viewer. Relative movement of the optical system's measuring markers and the stereomodel is detected by moving a scanner device over the planar surface of a grid device, which serves as an encoder and develops command signals corresponding to the coordinates of a selected relative position of the scanner device and the grid device. A computer then from the command signals develop control signals for casing a servo system to move the stereophotographs so that the markers and the stereomodel assume a relative position corresponding to the coordinates selected by the scanner device. The scanner device can also simultaneously plot a reproduction of the contour of the stereomodel being traced in any desired scale. Additionally, an XY plotter or coordinatograph can plot another reproduction of the same contour in a still different scale.

15 Claims, 4 Drawing Figures

INVENTORS
Uuno V. Helava &
BY Robert B. Forrest
Fisher & Schmidt
ATTORNEYS

INVENTORS
Uuno V. Helava &
BY Robert B. Forrest
Fisher & Schmidt
ATTORNEYS

PHOTOGRAMMETRIC APPARATUS

This invention relates to improvements in photogrammetric apparatus and in particular to photogrammetric apparatus of the stereo type.

Photogrammetric apparatus, such as that disclosed in the U.S. Pat. No. 3,116,555 to U. V. Helava and also that which is commercially available, when used for plotting contours of maps, models, etc., from stereophotographs usually requires for input purposes, manual manipulation of individual X and Y coordinate handwheels, and a Z coordinate footwheel and for output plotting a servo driven coordinatograph. The operation of such controls requires coordination as well as training to satisfactorily trace contour lines, particularly those that are relatively complex. To avoid these problems freehand controls have been resorted to; e.g., a pantograph actuated by freehand tracing. With the latter it is not possible to use a coordinatograph, if one should be wanted; for instance, to obtain a different scale drawing.

With the foregoing in mind, stereophotogrammetric apparatus is contemplated incorporating a unique freehand control provision whereby command signals representing information about a selected part of a stereomodel are developed by manually moving a single scanner device over the surface of a command signal developing device while viewing the stereomodel.

Also contemplated is stereophotogrammetric apparatus wherein coordinate information relative to a stereomodel is developed in digital form by a sheetlike grid device which has an array of conductive elements aligned so as to digitize the coordinates of the position of the scanner device relative to the surface of a grid device.

Further contemplated is stereophotogrammetric apparatus that provides a novel freehand operated scanner device for operating the apparatus so as to derive information about a stereomodel and that also can simultaneously plot reproductions of the stereomodel's contours. A related objective is the provision of such apparatus whereby a separate plotter can be operated to plot a reproduction of a stereomodel's contour either of the same or of a different scale. Another related objective is the provision of such apparatus whereby the freehand scanner device can plot a reproduction of a stereomodel's contour in a different scale.

The foregoing and other objects and advantages of the invention will become apparent from the following description and from the accompanying drawings in which.

Figure 1:
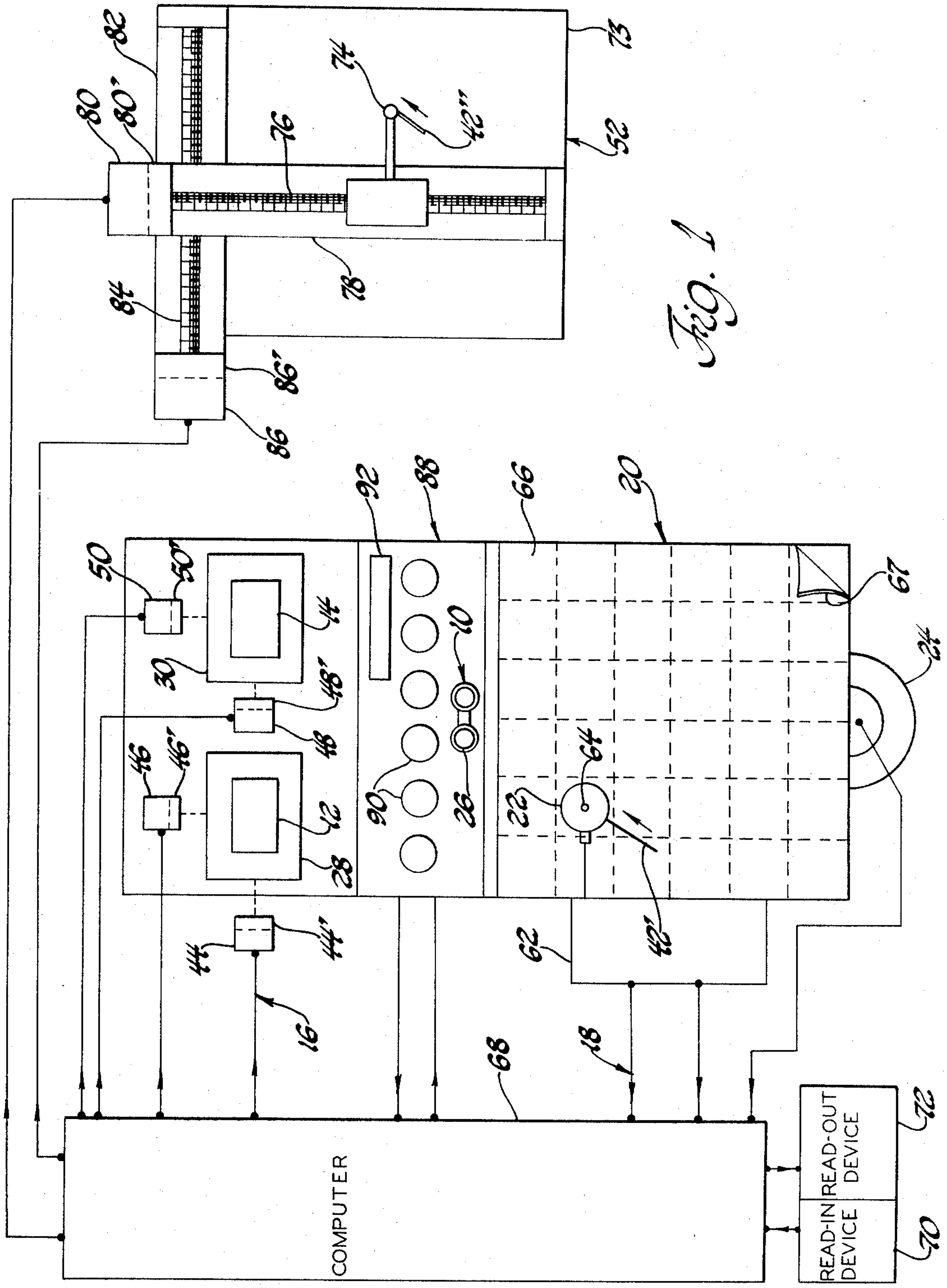
FIG. 1 is a schematic diagram of photogrammetric apparatus incorporating the principles of the invention.

Referring first to FIG. 1, the photogrammetric apparatus has an optical system, denoted generally at 10, which provides an operator with a view of a stereomodel having the contours to be analyzed. The stereomodel is derived from a pair of stereophotographs 12 and 14, which for purposes of example only, can be aerial photographs of a terrain to be mapped. The movement of the stereomodel required; e.g., to plot or trace the contours of the stereomodel, is effected by a servo system, denoted generally at 16. This servo system 16 operates in response to the commands of a control system viewed generally at 18. The input signals to the control system 18 are derived from a signal developer, shown as a grid device 20, when a signal sender or scanner device 22 is manuevered over the grid device 20 and a footwheel 24, which could be a handwheel, a lever, or the like. Except for the grid device 20 and the scanner device 22, the photogrammetric apparatus can be of any commercially available kind, such as the analytical plotter made by Ottico Meccanica Italiana of Rome, Italy and The Bendix Corporation of Detroit, Michigan, or generally similar to the photogrammetric plotter disclosed in the aforementioned U.S. Pat. No. 3,116,555. Hence, the description of this part of the FIG. 1 apparatus will only be described in sufficient detail to understand the principles of the invention.

Figure 2:
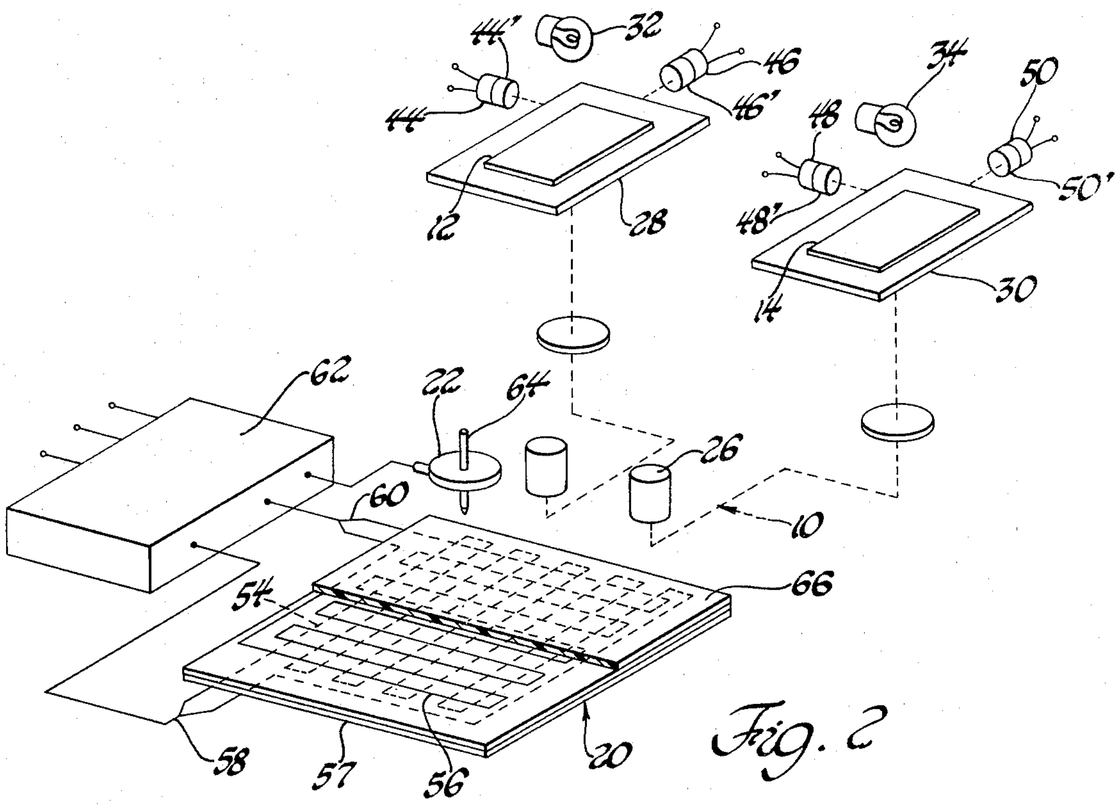
FIG. 2 is a schematic diagram of the FIG. 1 apparatus' optical system and its relation to a pair of stereophotographs and also includes a perspective view of the apparatus's scanner and grid devices.

The optical system 10, as viewed in FIG. 2, has an optical viewer 26, that combines with appropriate lens and prisms so that each of the eyes of the operator observes one of the photographs 12 and 14 when the photographs 12 and 14 are respectively positioned on photocarriers 28 and 30 and receive illumination respectively from suitable lamps 32 and 34. Assuming that the photocarriers 28 and 30 are properly positioned by this servo system 16, the images from the stereophotographs 12 and 14 will be projected in the proper overlapping relation to develop a 3D image or a stereomodel in the optical system 10. It should be noted that the projection is directly into the optical system 10 instead of through an intermediate screen with the stereomodel being observed through the binocular viewer 26.

In a way well known the optical system 10 therefore provides a direct orthoscopic viewing binocular train and preferably has an extremely high resolution with the optical magnification being determined by the application of the apparatus. Optical adjustment of the binocular viewer 26 can be made in the usual way.

Figure 3:
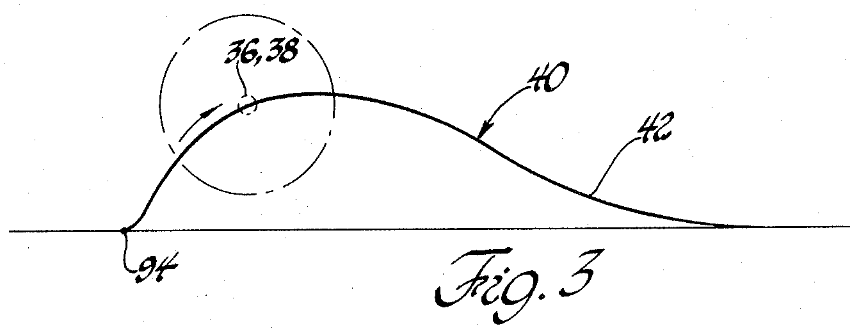
FIG. 3 is a view of a stereomodel whose contour is to be traced by the FIG. 1 apparatus.
Figure 4:
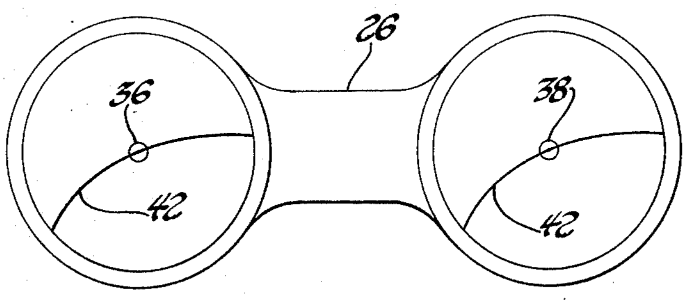
FIG. 4 is an enlarged view of how a part of the FIG. 3 stereomodel appears when observed through the FIG. 1 apparatus's binocular viewer.

Additionally, the optical system 10 incorporates measuring marks 36 and 38, respectively, aligned with the stereophotographs 12 and 14 and when observed through the binocular viewer 26 will appear as in FIG. 4 in alignment with whatever part of a stereomodel is being analyzed. For exemplary purposes, this can be a stereomodel of a hill, denoted at 40 in FIG. 3, and having a contour 42 to be traced or plotted. The two measuring marks 36 and 38 will, of course, merge into one when that part of the stereomodel 40 encircled in FIG. 3 is observed in the binocular viewer 26.

The servo system 16 manuevers the photocarriers 28 and 30 in two coordinate directions; for instance, the X and Y directions. If desired, the optical system 10 can be maneuvered in one direction and the photocarriers 28 and 30 maneuvered in the other direction. Various types of servomotors can be employed but preferably high performance digital servomotors are utilized by the servo system 16. The photocarrier 28 is manuevered by X-axis and Y-axis servomotors 44 and 46 and the photocarrier 30 by X-axis and Y-axis servomotors 48 and 50 through the agency of screw actuators in a well known way; e.g., as done by those employed by an XY plotter or coordinatograph, shown in FIG. 1 and denoted by the numeral 52. This coordinatograph 52 will be described in more detail later.

In operation, each of the servomotors; e.g., the X-axis servomotor 44 receives a digital signal directing the screw to be turned so many rotational increments in a given direction. As the screw turns an encoder (not shown) provides feedback pulses that count these increments until the count is zero or null. In the alternative stepping motors could be employed or servomotors that respond to a voltage which is matched with a feedback voltage in the usual way such that rotation ceases when there is a null.

Considering now the control system 18 and with reference to FIG. 2, the grid device 20 and the scanner device 22 can be any commercially available type two dimensional encoder; for example and for demonstration purposes only, the type known as the Datagrid digitizer, which is commercially available from The Bendix Corporation of Detroit, Michigan. This Datagrid digitizer is also shown and described in the U.S. application Ser. No. 805,559 to Knight V. Bailey and filed Mar. 10, 1969. Briefly the grid device, 20 includes an array of X- and Y-axis digital signal developing conductors 54 and 56 arranged in a grid configuration and either embedded in or on a base 57 formed of a sheetlike insulative material; by way of suggestion, any well known thermoplastic materials papers, asbesto papers and fabrics, glass fabrics and mats and wood veneers.

Obviously other configurations can be used if the particular application requires such. These conductors 54 and 56 are made of any of the usual good current conducting materials so as to be capable of functioning as signal receivers and have X- and Y-terminals 58 and 60 connected to suitable digitizing electronic and interface logic circuits 62. These circuits 62 provide AC energization for the scanner device 22, which serves as a signal sender and which incorporates a coil of a single or multiple turn configuration embedded in a thermoplastic material or something with similar characteristics. At the center of the coil, the scanner device 22 has scriber 64 removably attached. Thereto the scriber 64 can be a pen, pencil or the like and is adapted to provide a mark on a preferably planar surface 66 of the grid device 20 as will be discussed. If preferred, the scriber 64 can be detachably secured to the exterior of the scanner device 22.

The grid device 20 can either be in tablet form and installed on the top of a drafting board, not shown, or it may be a curved flexible sheet that can be wound on rollers around a drum-like member, not shown. In either form the grid device 20 presents the surface 66 with a shape that enables a stereomodel's coordinates to be determined or plotted. For the plotting function, the grid device 20 may either have an integral writing surface or be adapted for having a sheet of paper 67 permanently or semi-permanently attached thereto, such as the transportable device shown and described in the U.S. application Ser. No. 79,582, filed Oct. 9, 1970 to U. V. Helava and entitled "Sheet-like Information Retaining Devices."

In operation as the scanner device 22 is moved across the planar surface 66 of the grid device 20; e.g., along the X-axis, the scanner device 22 will induce in the X-axis conductor 54 as it crosses it a sinusoidally varying voltage that will be maximum when the center of the scanner device 22 is exactly over the X-axis conductor 54 and minimum when at a maximum displacement from it. Therefore, as the scanner device 22 is moved from a pre-determined reference or starting point and along the X-axis, these variations in the sinusoidally varying voltage are counted by the circuits 62. In this way, and as an example, it can be determined that a distance equal to three counts, which can be selected as the equivalent of three inches in length, has been traversed. If less than three counts but greater than two counts is traversed, the circuits 62 will provide interpolation by phase analyzing the sinusoidal varying voltage. By this phase analysis of the sine wave representing movement of the scanner device 22, the digital coordinates of any position of the scanner device 22 can be precisely determined, particularly points intermediate to the peaks of the sine wave. For instance, it could be determined that a distance of 2½ inches had been traversed. The scanner device 22, of course, can be moved in either direction with the counts being subtracted in one direction and added in the opposite. Consequently, there is an analog to digital conversion with the circuits 62 providing output X- and Y-axis digital command signals. Simultaneously the scriber 64 can provide a mark 42 (see FIG. 1) on the planar surface 66 as the scanner device 22 is moved across this surface 66.

The control system 18 also includes a suitable general purpose digital computer 68 for processing the command signals from the circuits 62 and also the command signals from the footwheel 24 so as to develop the appropriate control signals for the servo system 16. By employing a general purpose computer, it is possible to make other engineering statistical computations, such as distances and directions traveled, all of which may be helpful or ancillary to the photogrammetric functions of the apparatus. The numerals 70 and 72 respectively denote read-in and read-out devices, such as equipment or the equivalent for supplying the programs and input data to the computer 68 and for recording data from the computer, 68; e.g., the coordinates of the position of the scanner device 22. The computer program necessarily has to take into consideration many factors to achieve the proper maneuvering of the photocarriers, 28 and 30. For instance, when aerial photograph is involved, consideration must be given to the tilt of the photographing camera used to make the stereophotos 12 and 14, atmospheric refraction, lens distortion, film shrinkage, earth curvature, etc.

Additionally, the computer 68 can be programmed to vary the scale movement between that of the scanning device 22 and that of the servo system 16 so that, by way of example, the contour plotted by the scriber 64 has a smaller scale than that of the stereomodel 40. This can in the alternative, be done by including change speed gearing in the servo system 16 so that the rotations of the screw actuators by the servomotors provide the desired scale relationship; specifically, each of the servomotors 44, 46, 48 and 50 would include change speed gearing 44', 46', 48' and 50'.

The computer 68 can also be used to drive the coordinatograph 52. As illustrated in FIG. 1, the coordinatograph 52, which is conventional, has a table 73 on which a sheet of paper, map or the like may be positioned to receive a mark from a pen or pencil type scriber 74. The scriber 74 is carried on and moved in the Y-axis direction by Y-axis screw 76, which is supported on a Y-axis carriage 78 and is revolved by a Y-axis servomotor 80. The Y-axis carriage 78 is supported on an X-axis carriage 82, which includes an X-axis screw 84. The X-axis screw 84 is revolved by an X-axis servomotor 86 so that the Y-axis carriage 78 is moved in the X direction and accordingly the scriber 74 along the surface of the table 73. Consequently, while the operator of the photogrammetric apparatus is maneuvering the scanner device 22, to make a mark 42' on the planar surface 66 of the grid device 20, the command signals developed by the circuits 62 will be processed by the computer 68 so as to cause the X- and Y-axis servomotors 86 and 80 to maneuver the scriber 74 and form the same contour 42'' as that made by the scanner device 22. The computer 68 can also be programmed so that the contour 42'' plotted by coordinatograph's scriber 74 has either a greater or a lesser scale than that plotted by the scanner device's scriber 64. This can, as previously discussed, be alternatively done by including suitable change speed gearing 80' and 86' in the drive train to the X- and Y-axis screws 84 and 76.

Referring again to FIG. 1, additional commands can be supplied to the computer 68 from a control panel 88, which preferably includes the binocular viewer 26, by way of hand-operated push buttons or dials 90. Also the control panel 88 can include one or more data display devices 92 for visually showing whatever data the operator should like to be able to observe during the operation of the photogrammetric apparatus.

To summarize the operation, it will be assumed that the stereophotographs 12 and 14 have been installed and that a sheet of paper 67, if such is to be used, has been placed on the grid device 20. Also, it will be assumed that the coordinatograph 52 is to be used and it, of course, will include plotting paper. The computer 68 is rendered operative and any additional commands inserted by operation of the dials 90 on the control panel 88. It will further be assumed that the appropriate position adjustments of the stereophotographs 12 and 14 have been made so that when the operator looks into the binocular viewer 26, he will observe the stereomodel 40 as shown in FIG. 3 which could be, as earlier mentioned, a hill or some other contour to be traced. Again and as mentioned before when the operator is looking into the binocular viewer 26, each eye will be observing one of the stereophotographs 12 and 14 and of course will be observing also the measuring marks 36 and 38 as shown in FIG. 4. The eyes of the viewer will combine the measuring marks 36 and 38 and the images from the two stereophotographs 12 and 14 so that the stereomodel 40 in FIG. 3 will be observed with a single mark. For explanatory purposes it will be assumed that the scanning device 22, with its scriber 64 will be at a beginning reference point, as will be measuring marks 36 and 38 and the scriber 74 for the coordinatograph; e.g., a reference point 94 in FIG. 3 at the base of the stereomodel 40. The footwheel 24 will have its position maintained constant so that only the X and Y coordinates of the stereomodel 40 will be determined.

While viewing the stereomodel 40 in FIG. 3, the operator moves the scanning device 22 in the direction of the arrows in FIG. 1 to commence the plot endeavoring to always keep the combined measuring marks 36 and 38 on the ground or surface of the stereomodel 40. As the scanning device 22 is moved the digitized X and Y coordinates of its position are developed by the circuits 62 and supplied to the computer 68. The computer 68 will develop the appropriate digital signals for operating the servo system 16 and cause the photocarriers 28 and 30 to maneuver the photographs 12 and 14 relative to the optical system's measuring marks 36 and 38. Consequently, the stereomodel 40 will be moved relative to the combined measuring marks 36 and 38 and as observed in FIG. 3 these combined marks 36 and 38 will appear to move in the direction of the arrows and along the contour 42. In the meantime, the operator can as he views the stereomodel 40 in the binocular viewer 26 note when he is off course and make the corrections with a corresponding movement of the scanning device 22. In this way, the operator will by keeping the combined measuring marks 36 and 38 on the contour 42 trace its entire extent and plot the corresponding contour 42' on the paper 67. A record of the coordinates can be made by the read-out device 72. The data display device 92 on the control panel 88 can also provide these coordinates.

In effect, this operation is similar to that of a closed loop control system. The operator observes through the binocular viewer 26 where the combined measuring marks 36 and 38 are with respect to the stereomodel contour 42. Then assuming that the operator desires to track in the direction of the arrows in FIG. 3, he moves the scanner device 22, which serves as the input transducer, in the corresponding direction. The appropriate command control signals are developed for effecting the desired movement of the combined measuring marks 36 and 38 relative to the contour 42. The operator views this movement and hence the optical system 10 serves as the feedback loop.

As can be appreciated, the operator enjoys freehand operation and does not need to devote each hand to the manuevering of a separate control. Additionally, a plot is made of the contour which avoids the need for the coordinatograph 52. Then too, the computer 68 can be programmed to give whatever scale relationship is desired between the contour 42 of the stereomodel 40 and the contour 42' being plotted or in the alternative gearing used.

The coordinatograph 52, as has been explained, can nevertheless be used beneficially during this operation when a larger scale plot of the contour 42 is desired. In this event, the contour 42' plotted by the scanner device 22 would be of a smaller scale. The control system 18 then would drive the coordinatograph 52 in the aforedescribed way so that its scriber 74 will develop the larger scale contour 42''.

What is claimed is:

1. Photogrammetric apparatus comprising optical means having viewer means provided with measuring mark means; means projecting a pair of stereoscopic photographs into the optical means so as to form a stereomodel therein for visual observation through the viewer means; means maneuvering the measuring mark means and each of the photographs relative to each other; and means controlling the maneuvering means; the controlling means including manually movable scanner means, command signal developing means energizable by the scanner means so as to generate command signals corresponding to positional information about the relative positions of the scanner means and the signal development means, and means computing and developing control signals corresponding to the command signals for causing the maneuvering means to effect relative movement between the measuring mark means and the stereomodel in accordance with the positional information.

2. Photogrammetric apparatus as described in claim 1, wherein the signal generating means provides the command signals in digital form and the command signals correspond to the positional coordinates of the scanner means relative to the signal developing means.

3. Photogrammetric apparatus as described in claim 1, wherein the signal developing means includes a surface capable of receiving information and the scanner means includes a scriber adapted to plot on the surface of the signal developing means.

4. Photogrammetric apparatus as described in claim 1, and further including plotting means driven by the control signal developing and computing means so as to provide a plot corresponding to the relative movement between the measuring mark means and the stereomodel.

5. Photogrammetric apparatus as described in claim 4, wherein the signal developing means includes a surface capable of receiving information and the scanner means includes a scriber for making a mark on the surface as the scanner means is moved relative thereto.

6. Photogrammetric apparatus as described in claim 5, wherein the signal developing means provides command signals in digital form corresponding to the positional coordinates of the scanner means relative to the signal developing means surface.

7. Photogrammetric apparatus as described in claim 1, wherein the signal developing means includes a sheet-like base member having a surface thereon capable of receiving information and an array of digital signal developing elements carried by the base member and aligned so as to render the array capable of cooperating with the scanner means to provide the position coordinates in digital form of the scanner means relative to the surface.

8. Photogrammetric apparatus as described in claim 1, wherein the signal developing means includes a sheet-like base member provided with a writing surface thereon and including an array of digital signal developing elements carried by the base member and grid aligned so as to render the array capable of cooperating with the scanner means so as to provide the position coordinates in digital form of the scanner means relative to the surface and the scanner means includes a scriber for making a mark on the surface as the scanner means is moved relative thereto.

9. Photogrammetric apparatus as described in claim 3, wherein the control signal developing and computing means is so programmed that the plot made by the scriber has a scale different from that resulting from the relative movement between the measuring mark means and the stereomodel.

10. Photogrammetric apparatus as described in claim 9, and further including plotting means driven by the control signal developing and computing means so as to develop another plot corresponding to the relative movement between the measuring mark means and the stereomodel of a different scale.

11. Stereophotogrammetric apparatus comprising means developing a visually observable stereomodel; measuring mark means; means manuevering the measuring mark means and the stereomodel relative to each other so as to trace a selected part of the stereomodel; and means controlling the maneuvering means; the controlling means including a manually movable scanner device, a positioning encoder device energizable by the scanner device to provide positional information in digital form about the relative positions of the devices, and means computing and developing control signals corresponding to the digital command signals for causing the maneuvering means to effect relative movement between the measuring mark means and the stereomodel corresponding to the relative movement between the devices.

12. Stereophotogrammetric apparatus as described in claim 11, wherein the positioning encoder device has a planar surface thereon adapted to receive marks and the manually movable scanner device includes a scriber adapted to plot on the surface of the positioning encoder device the relative movement between the devices and accordingly the relative movement between the measuring mark means and the stereomodel.

13. Photogrammetric apparatus as described in claim 11 wherein the positioning encoder device includes a sheet-like base member made of an electrically insulated material, a sheet member with information thereon or adapted for receiving information and positional on the base member, an array of electric conductors carried by the base and grid aligned so as to render the array capable of cooperating with the scanner device to provide in digital form the position coordinates of the scanner device relative to the positioning encoder device and the scanner device includes a scriber for making a mark on the sheet member when the scanner device is moved.

14. Stereophotogrammetric apparatus as described in claim 12 wherein the maneuvering means is adapted to effect relative movement between the measuring mark means and the stereomodel so that the relative movement between the devices plotted by the scriber has a different scale relationship.

15. Stereophotogrammetric apparatus as described in claim 14 and further including plotting means adapted to provide another plot of the relative movement between the measuring mark means and the stereomodel and of a still different scale relationship.

* * * * *